C. A. King,

Band Pulley.

No. 3928. Reissued Apr. 19. 1870.

Charles A. King
D. B. Wesson assignees
of

Witnesses Clarence Buckland
M. L. Boynton

Charles A. King Inventor.
By J. H. Curtis, Atty.

N. PETERS, PHOTO-LITHOGRAPHER, WASHINGTON, D. C.

United States Patent Office.

CHARLES A. KING AND DANIEL B. WESSON, OF SPRINGFIELD, MASSACHUSETTS, ASSIGNEES OF CHARLES A. KING.

*Letters Patent No.* 95,912, *dated October* 19, 1869; *reissue No.* 3,928, *dated April* 19, 1870.

IMPROVED OILER FOR LOOSE PULLEYS.

The Schedule referred to in these Letters Patent and making part of the same

*To all whom it may concern:*

Be it known that CHARLES A. KING, of Springfield, Hampden county, State of Massachusetts, has invented a new and useful Improved Oiler for Loose Pulleys, and that the following is a full, clear, and exact description thereof, reference being had to the accompanying drawings making a part of this specification, and to the letters of reference marked thereon, in which—

Figure 1:
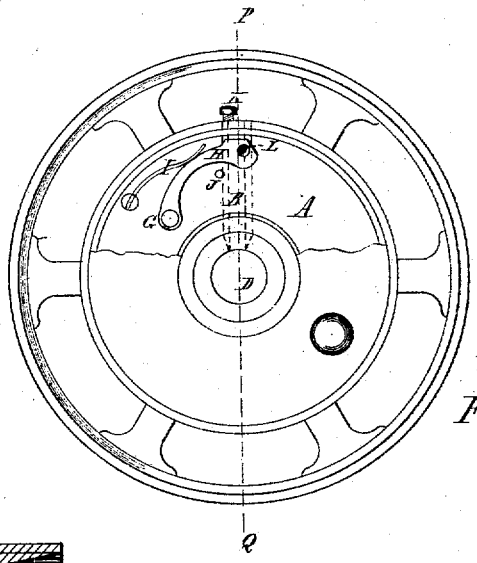
Figure 1 is a side view of a pulley having the invention applied, and showing the valve arrangement in the interior of the annular oil-chamber.

The invention relates to a device for lubricating the bearing of a loose pulley, in which a tube is used, having at the end which is farthest from the bearing a chamber or reservoir, the other end of said tube being open directly upon or against the bearing of the pulley.

A small communicating or supply-duct furnishes a passage for the oil from the oil-supply vessel into the tube or its chamber, said communicating or supply-duct opening into the said tube or its chamber at a point a little nearer the bearing than the extreme outer end of the tube or chamber.

During the rapid revolution of the pulley the oil, which is admitted into the tube through the communicating duct, is thrown by the centrifugal force into the extreme outer end of the tube or its chamber, and is caused to remain there during the rapid revolution of the pulley; but as soon as the pulley revolves sufficiently slow to cause the centrifugal force to cease, either partially or wholly, the oil which has been forced into the outer end of the tube or its chamber will run in toward and upon the bearing, and lubricate it sufficiently for its next use.

In the device shown an arm is pivoted to the base of the oil-vessel, through the loose end of which arm is a hole. This part of the arm having the hole therein should fit well to the base of the oil-vessel, against which it plays; and a pin or projection is placed just below the arm, which limits its movement toward the bearing, while a spring, pressing against the opposite side of the arm, operates to keep the arm always in against the pin while the pulley is at rest; and a set-screw in the perimeter of the oil-vessel determines the outward movement of the loose end of the arm.

The following is a description of the construction and operation of the invention, which will enable others skilled in the art to make and use the same.

In the drawings—

A represents the oil-chamber, which is annular in form, having a hole in the center, which should fit properly the hub of the pulley, upon which it is placed.

The base of the chamber, bearing against the spokes of the pulley, is secured to the hub D′ by means of the lubricating-tube B, which is screwed down through a projecting part of the chamber at C.

The end of this tube B is beveled at the end, and fitted into a corresponding socket made in the hub D′, which secures the oil-chamber firmly in place.

A small duct or passage, E, is made through the part E′ of the oil-chamber, communicating with the tube B, its opening into said tube being a little distance inward toward the bearing from the extreme outer end of the tube; and this part of the tube or space therein, which is beyond the said duct or passage E, is denominated the reservoir N; and this reservoir N, located at a greater distance from the bearing D than the small duct E, and still communicating with said duct, is an important and essential feature of the invention.

F is an arm, pivoted at G to the base of the annular oil-chamber A, and the loose end, at H, may be made somewhat larger and heavier, if desirable, so that it may the more readily be thrown outward, during the rapid revolution of the pulley, against the end of the adjustable set-screw K, which is inserted in th periphery of the annular chamber A, to regulate the outward play of the arm F.

The inner side of this part H of the arm should fit well against the base of the annular chamber A, and a hole, L, is made in the loose end H, which hole communicates with the passage E when the valve is thrown outward against the end of the set-screw K.

Figure 3:
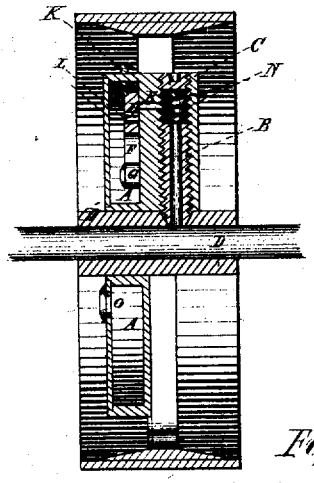
Figure 3 is a vertical transverse section of the same, through line of fig. 1.
Figure 2:
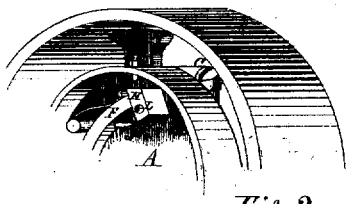
Figure 2 is a perspective view of the same.

But when the pulley is at rest or is revolving slowly, and the valve is moved inward toward the pin or projection J by the pressure of the spring I, attached to the base of the annular chamber A, the holes L and E do not communicate with each other to furnish a continuous passage through from the interior of the annular chamber A to the tube B. This is shown distinctly in fig. 3.

By turning the screw K in, or out, the holes L and E may be made to communicate more or less, as may be desirable, to regulate the flow of oil through the holes L and E.

Fig. 1 represents the valve thrown outward against the set-screw K, by the centrifugal force created by the rapid revolution of the pulley.

An orifice, O, is made in the front plate of the annular chamber A, through which to pour in the oil, and is stopped by a screw-cap.

In the drawing the interior of the part C is shown with a screw-thread made therein, and the tube B has a corresponding screw-thread made thereon, so that said tube may be screwed down into the threaded part C until the beveled end of the tube B fits properly into its socket in the hub D′. The outer end of the threaded hole may then be stopped by a threaded plug, turned in to the desired distance, leaving the space or reservoir N, beyond the duct E, to receive the oil from the chamber A.

The operation of the invention is as follows:

The lubricating oil having been placed within the annular chamber A, the pulley may be set in rapid motion, and the centrifugal force will cause the valve F to be thrown outward toward or against the set-screw K. The hole L in the part H and the duct F will then coincide, and the oil, aided by the centrifugal force, is free to pass from the chamber A, through the passage so made, into the tube B, the centrifugal force causing it to be thrown out into the chamber or space N beyond the duct E, where it will remain as long as the pulley keeps up its rapid revolution. But when the pulley begins to revolve slowly, as in the act of stopping, the valve H will be pressed inward toward the pin J, and communication between the chamber A and tube B will be cut off. The oil which has been gathered in the reservoir N will then flow toward and upon the bearing D, and will lubricate it sufficiently for its next use. When the chamber A has been once filled with oil, the regular and desirable daily lubrication of the bearing may be maintained without any other trouble or expense, and with no waste of oil.

It is evident that the size of the space or reservoir N beyond the duct E is immaterial, as said reservoir may be either larger or smaller in diameter than the tube B, or it may be merely a continuation of said tube, as may be most convenient in construction, the device being equally operative in either case.

As various modifications of the device used for admitting the oil from the chamber A to the duct E may be made without affecting the principle involved, the invention is not limited to the exact construction of the several parts herein shown composing the device; but, Having described the invention,

What is claimed as new, and desired to be secured by Letters Patent, is—

1. A valve for pulley-lubricators, operated by the centrifugal force obtained from the revolution of the pulley, said valve opening and closing a passage communicating with the pulley-bearing.

2. The combination of the annular chamber A, oiling-tube B, valve F, and spring I, all constructed and operating substantially as described.

3. In a self-oiling device, the tube B with its reservoir N, in combination with a supply-duct E, substantially as described.

4. The independent annular oil-chamber A, constructed in the manner and for the purpose set forth.

CHARLES A. KING.
DANIEL B. WESSON.

Witnesses:
T. A. CURTIS,
H. W. HALLETT.